(12) United States Patent
Martinez

(10) Patent No.: US 8,005,024 B2
(45) Date of Patent: Aug. 23, 2011

(54) METHOD FOR ESTABLISHING AN IP VIDEO-CONFERENCE USING A TELEPHONE NETWORK FOR VOICE TRANSMISSION

(75) Inventor: Jose-Maria Martinez, Barcelona (ES)

(73) Assignee: Alcatel Lucent, Paris (FR)

( * ) Notice: Subject to any disclaimer, the term of this patent is extended or adjusted under 35 U.S.C. 154(b) by 1681 days.

(21) Appl. No.: 11/256,005

(22) Filed: Oct. 24, 2005

(65) Prior Publication Data

US 2006/0087988 A1    Apr. 27, 2006

(30) Foreign Application Priority Data

Oct. 25, 2004  (EP) .................................... 04292522

(51) Int. Cl.
*H04L 12/16*    (2006.01)
(52) U.S. Cl. ......... 370/261; 370/352; 370/353; 370/401
(58) Field of Classification Search .................... 370/352
See application file for complete search history.

(56) References Cited

U.S. PATENT DOCUMENTS

| | | | | |
|---|---|---|---|---|
| 6,061,434 | A * | 5/2000 | Corbett ....................... | 379/93.35 |
| 6,363,424 | B1 * | 3/2002 | Douglas et al. ............... | 709/224 |
| 6,693,662 | B1 * | 2/2004 | Parker et al. ............... | 348/14.01 |
| 7,333,505 | B2 * | 2/2008 | Yoakum et al. ............... | 370/466 |
| 7,564,840 | B2 * | 7/2009 | Elliott et al. .................. | 370/356 |
| 2002/0083462 | A1 | 6/2002 | Arnott | |
| 2002/0168057 | A1 * | 11/2002 | Davis ......................... | 379/93.35 |
| 2003/0202088 | A1 * | 10/2003 | Knight ........................ | 348/14.08 |
| 2004/0120498 | A1 * | 6/2004 | Sylvain ..................... | 379/221.01 |
| 2004/0145650 | A1 * | 7/2004 | Jarboe et al. ............... | 348/14.01 |
| 2004/0239754 | A1 * | 12/2004 | Shachar et al. ............. | 348/14.08 |
| 2005/0073574 | A1 * | 4/2005 | Krisbergh et al. ......... | 348/14.01 |
| 2005/0111438 | A1 * | 5/2005 | Kim ............................ | 370/352 |
| 2005/0213740 | A1 * | 9/2005 | Williams et al. ......... | 379/211.02 |
| 2005/0243806 | A1 * | 11/2005 | Sakano et al. ................ | 370/352 |
| 2006/0002373 | A1 * | 1/2006 | Denny ......................... | 370/352 |
| 2006/0050685 | A1 * | 3/2006 | Sung et al. ................... | 370/352 |
| 2006/0075108 | A1 * | 4/2006 | Sylvain ....................... | 709/227 |

FOREIGN PATENT DOCUMENTS

WO    WO 99/44363 A    9/1999
WO    WO 03/092287 A1    11/2003

* cited by examiner

*Primary Examiner* — Nathan Flynn
*Assistant Examiner* — Wutchung Chu
(74) *Attorney, Agent, or Firm* — Fay Sharpe LLP

(57) ABSTRACT

A method of establishing video-conferences between audio communication equipments (ACE1, ACE2) comprises a) using a user audio communication equipment (ACE1) to initiate a first call with another user audio communication equipment (ACE2), b) routing the first call to an exchange node (SSPN) of the telephone network (TN) in order it transmits a message, comprising the telephone numbers of the user audio communication equipments (ACE1, ACE2), to a service node (SN) connected to the telephone (TN) and Internet (IN) networks, c) authorizing the exchange node (SSPN) to establish the first call when the telephone numbers are stored in a memory (MY) of the service node (SN), in order to set up an audio communication between the audio communication equipments (ACE1, ACE2), d) determining, if required, the addresses of the user video communication equipments (VCE1, VCE2) in order to establish a video communication therebetween, in parallel with the audio communication.

18 Claims, 1 Drawing Sheet

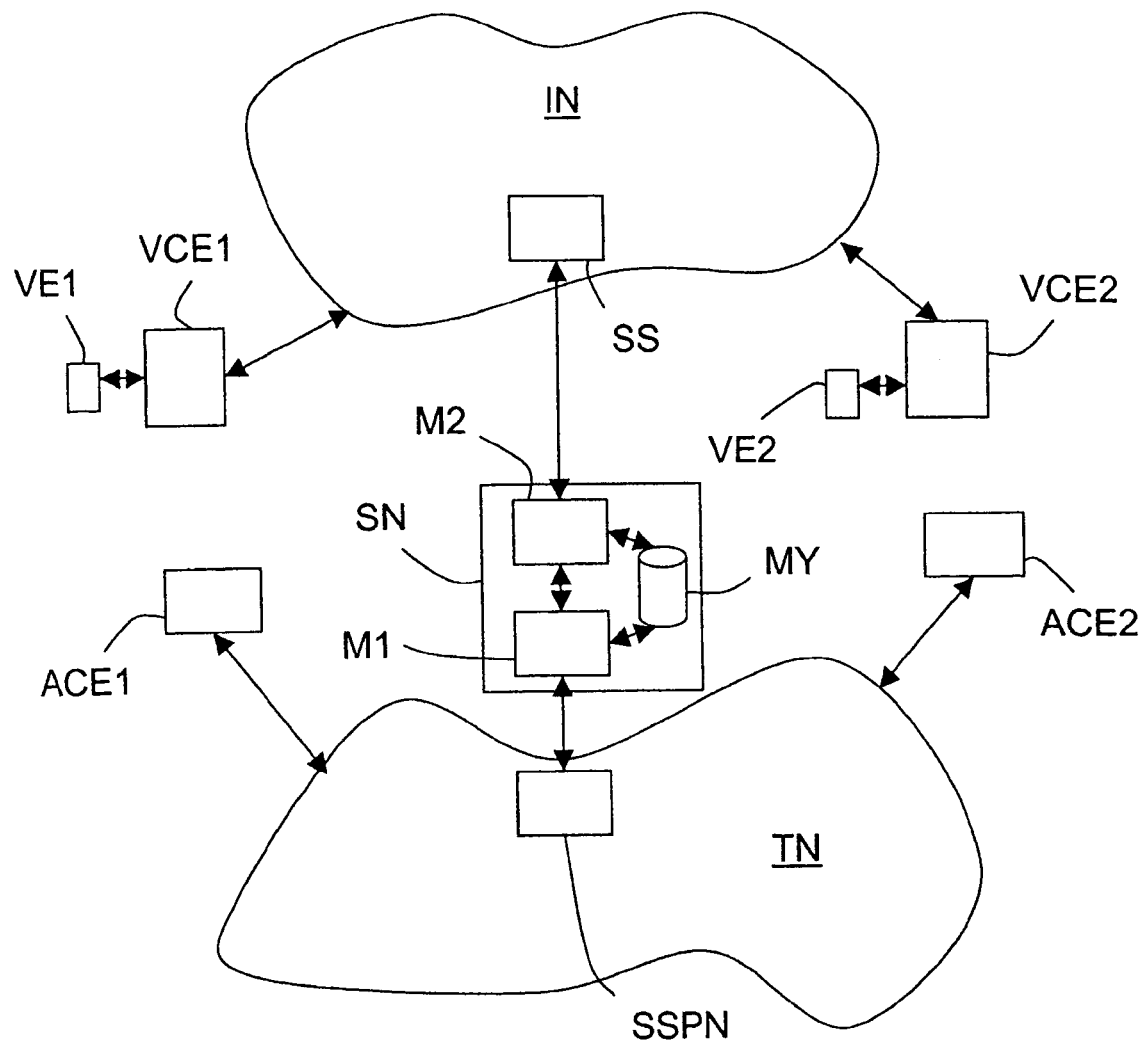
Unique figure

METHOD FOR ESTABLISHING AN IP VIDEO-CONFERENCE USING A TELEPHONE NETWORK FOR VOICE TRANSMISSION

BACKGROUND OF THE INVENTION

The present invention relates to the domain of communication networks, and more precisely to the establishment of video-conference in such communication networks.

Several solutions have been proposed to allow the establishment of video-conference between distant communication equipments connected to communication networks.

A first family of solutions offers a full IP ("Internet Protocol") video-conference by using an Internet protocol (IP), such as H.323 or SIP ("Session Initiation Protocol") to transmit both audio and video data between audio and video equipments of distant users over an Internet network.

Such solution family works well but its use is generally restricted to people familiar to IP network operations through communication equipments such as personal computers (PC). Moreover, the called party must be generally warned in advance of the possibility of being called through the Internet network. More, the medium used to transmit the audio and video being the same, the whole communication is degraded or even stopped in case of problem on the medium.

A second family of solutions offers a mixed IP/telephone video-conference by using simultaneously an Internet network to transmit the video data and a telephone network to transmit the audio data.

One solution of this second family is described in the patent document US 2002/0083462. It consists in using, both on the calling and called user sides, apparatuses merging a standard telephone, a digital camera and a display means, and connected to a standard telephone network (or POTS for "Plain Old Telephone Service") and to an Internet network (through the POTS network (for instance with the so-called ADSL ("Asymetric Digital Subscriber Loop")), or through a cable network). The apparatuses establish a video communication by transmitting one to the other short data bursts comprising their respective IP addresses, over the POTS network.

This solution is convenient for the users because the video-conference establishment is managed by their dedicated apparatuses. But it requires that each user be equipped with the dedicated apparatus.

Another solution of this second family is described in the patent document WO 03/092287. It consists in using the telephone of a client, connected to a POTS network, and also equipped with an IP communication equipment, to initiate an audio communication requiring the establishment of a video-conference with it. Then the call center transmits a dedicated web page to the client IP communication equipment in order to collect information on the client and its audio and video equipments and to control the establishment of the video transmission over the Internet network in parallel with the audio transmission over the POTS network. The phone call of the video-conference is started from an integration server of the call center by means of an Internet call management server, a computer telephony server and a phone switch.

With such a solution the user only requires a small knowledge of the Internet world and does not require any dedicated equipment. But this only allows a video-conference between a user and a call center, and not a user to user video-conference. Moreover, this solution does not allow either to the calling user or to the call center to start in a pure audio mode (without video) and then to decide at any moment to continue in a video-conference mode with both audio and video data transmission.

SUMMARY OF THE INVENTION

So, the object of this invention is to provide a method for establishing a mixed user to user IP video-conference over a telephone network and an Internet network, which overcomes the drawbacks of the known methods, at least partly.

For this purpose, it provides a method for establishing a video-conference between audio communication equipments (each associated to a user and to a telephone number and connected to a telephone network) and video communication equipments (each associated to one of the users and to an IP address and each connected to a video equipment and to an Internet network).

One means here by "audio communication equipment" any type of communication equipment having a phone number and arranged to establish at least (audio) telephone calls over a telephone network. So it could be a fixed telephone connected to a POTS network or a PSTN ("Public Switched Telephony Network"), or a mobile telephone connected to a cellular radio network (such as a GSM one or a GPRS/EDGE one or else an UMTS one), or else a laptop or a PDA ("Personal Digital Assistant") provided with an audio communication module, or else an audio communication device connected to a voice over IP (Vol P) network over the Internet network.

Moreover, one means here by "video communication equipment" any type of communication equipment having an IP address and arranged to transmit and receive at least video data over an Internet network. So it could be a fixed personal computer (PC), or a television (TV) set connected to a set-top-box (or STB) itself connected to an Internet network (possibly through a xDSL network or a cable network) and to a video equipment delivering digital video data, such as a digital video camera.

This method consists in:

a) using an audio communication equipment, associated to a calling user, to initiate a first call with at least another audio communication equipment, associated to a called user, b) routing the first call to a chosen exchange node of the telephone network so that it transmits a message (comprising the telephone numbers of the audio communication equipments of the calling and called users) to a service node which is connected to the telephone network and to the Internet network, c) authorizing the exchange node to establish the first call when both these telephone numbers are stored in a memory (or any equivalent memorizing means) of the service node, in order to set up an audio communication between the audio communication equipments of the calling and called users, d) and if required determining the addresses of the video communication equipments of the calling and called users (which are associated to the telephone numbers in the service node memory) in order to establish a video communication between these video communication equipments, in parallel with the audio communication.

The method according to the invention may include additional characteristics considered separately or combined, and notably:

in step d) the establishment of the video communication may be triggered by one of the audio communication equipment of the calling and called users, the triggering of the video communication establishment may be carried out by means of a second call at a called number defined by a service access code routed to a chosen exchange node, from either the calling or called user, after holding the first call, when the exchange node receives the second call it may transmit a message to the service node comprising the telephone number of the audio communication equipment of the calling or called user, and the service access code, when the service node receives the message it may determine if the telephone number it was sent from is stored in the memory and if the audio communication equipment associated to this telephone number is engaged in a managed first call, and in this case it may establish the video communication between the addresses of the video communication equipments of the calling and called users, the establishment of the video communication may be triggered by means of a (calling or called) user action on a dedicated key of his audio communication equipment, in step d) the establishment of the video communication may be triggered by one of the video communication equipments of the calling and called users having established a first call (managed by the service node) between their respective audio communication equipments, the triggering of the video communication establishment may be carried out by means of a transmission of a video request (comprising the address of the video communication equipment of the calling or called user, and a dedicated address at the service node SN) to a dedicated server arranged to route the video request to the service node, through the Internet network, when the service node receives the video request it may determine if the address generating it is stored in the memory and if the audio communication equipment associated to this address is engaged in a first call (managed by itself), and in this case it establishes the video communication between the addresses of the video communication equipments of the calling and called users, the establishment of the video communication may be triggered by means of a (calling or called) user action on a dedicated key of his video communication equipment, in step d) the service node may automatically trigger the establishment of the video communication if i) the telephone numbers of the audio communication equipments of the calling and called users are stored in the memory in correspondence with data representative of an automatic video establishment authorization, and ii) it has received from the telephone network a message signalling that the audio communication has been effectively established between the audio communication equipments of the calling and called users, in step d) the service node may establish the video communication by means of a SIP call between the addresses of the video communication equipments of the calling and called users, in steps b) and d) the messages may be transmitted by means of an INAP protocol, such as CS1 for instance, during the video communication the service node may remove any audio data from the video data transmitted by one of the video communication equipment to the other in order to transmit only video streams, when the exchange node detects that the audio communication between the audio communication equipments is finished, it may transmit a message to the service node, and when the service node receives this message it stops the video communication, the audio communication establishment may be controlled by means of a first module of the service node, and the video communication establishment may be controlled by means of a second module of the service node, which is connected to this first module.

Other features and advantages of the invention will become apparent on examining the detailed specifications hereafter and the appended drawing.

DESCRIPTION OF THE DRAWINGS

The unique FIGURE schematically illustrates a part of a communication system adapted to implement the method according to the invention.

DETAILED DESCRIPTION

The appended drawing may not only serve to complete the invention, but also to contribute to its definition, if need be.

The aim of the invention is to allow the establishment of an IP video-conference using a telephone network of a communication system for voice transmission.

As schematically and partially illustrated in the unique FIGURE, to implement the method according to the invention a communication system must comprise at least a telephone network TN to which are connected audio communication equipments ACEi, an Internet network IN to which are connected video communication equipments VCEi, and a service node SN connected to the telephone network TN and to the Internet IN network.

In the illustrated example the index i, of the audio ACEi and video VCEi communication equipments, is equal to 1 or 2, but it may take any value greater than 1.

In the following description it will be considered that the audio communication equipments ACEi of the users are fixed telephones connected to a POTS network or a PSTN network. But the audio communication equipments ACEi could be also mobile telephones connected to a cellular radio network, such as a GSM network or a GPRS/EDGE network or else an UMTS network, or else audio communication devices connected to a voice over IP (VoIP) network over the Internet network IN.

Moreover, in the following description it will be considered that the video communication equipments VCEi of the users are a TV set and a set-top-boxes (or STBs) connected to the Internet network IN and to a video equipment VEi delivering digital video data, such as a digital video camera. But the video communication equipments VCEi could be also fixed personal computers (PCs) connected to the Internet network IN and to a video equipment VEi. The video communication equipment VCEi may be connected to the Internet network IN over the telephone network TN (for instance via ADSL ("Asymetric Digital Subscriber Loop")) or over a cable network.

According to the invention, the communication system comprises a service node SN which is both connected to the telephone network TN and to the Internet network IN.

This service node SN is arranged to manage firstly the establishment of an audio communication between telephones VCE1 and VCE2 of the calling and called users over the telephone network TN, and if required the establishment of an associated and complementary video communication over the Internet network IN.

In order to allow the video-conference establishment to be managed by the service node SN, each user client needs to be registered in this service node SN. For this purpose the service node SN may comprise a memory MY (or any equivalent memorizing means, such as a database) in which is stored a look up table establishing a correspondence between the telephone number of the audio communication equipment ACEi of each user and the address of his video communication equipment VCEi.

Preferably and as illustrated in the unique FIGURE, the service node SN comprises a first module M1 connected to the telephone network TN and to the memory MY and a second module M2 connected to the Internet network IN, to the first module M1 and to the memory MY.

The first module M1 is dedicated to the management of the audio communication establishment over the telephone network TN, while the second module M2 is dedicated to the management of the video communication establishment over the Internet network IN.

Also preferably and as illustrated in the unique FIGURE, the telephone network TN of the communication system comprises at least one exchange node SSPN. This exchange node SSPN is arranged to generate a message for the service node SN each time a calling user telephone ACEi wants to establish a first call with a called user telephone ACEi, and/or each time a calling or called user signals, with his telephone ACEi, that he wants to transmit video data, and/or each time it is warned that the called user has accepted to respond to the telephone call initiated by the calling user. The message indicating the establishment of this first call could be triggered for example upon the calling user initiating a call, or upon the called user receiving it.

The method according to the invention comprises a first step a) in which a calling user (registered in the service node SN) uses his telephone ACE1 to initiate a first telephone call with the telephone ACE2 of at least one called user (also registered in the service node SN). For this purpose he dials the telephone number of the telephone ACE2 with its own telephone ACE1.

This method goes on with a second step b) in which the telephone network TN routes the first telephone call to an exchange node SSPN, for instance the one the telephone ACE2 depends from, so that it transmits a message, comprising the telephone numbers of the telephones ACE1 and ACE2 of the calling and called users, to the service node SN. In a variant, the message might be generated by the (local) exchange node (or LEX) from which depends the telephone ACE1 of the calling user.

More precisely, during this second step b) the telephone network routes the first (telephone) call up to the (local) exchange node SSPN, which is in charge of the telephone ACE2 of the called user (for instance) and which acts as a service switching point SSP in an Intelligent Network architecture, using the standard PSTN signalization. Then this (local) exchange node SSPN generates a message (comprising the telephone numbers of the telephones ACE1 and ACE2 of the calling and called users) for the first module M1 of the service node SN.

The (local) exchange node SSPN may use an INAP ("Intelligent Network Application Part") protocol such as CS1 ("Capability Set 1"), for instance, to transmit the message to the service node SN, and more generally to exchange data with it. In such an INAP architecture the (local) exchange node SSPN acts as a service switching point SSP and the service node SN acts as a service control point SCP.

Any other standard or proprietary INAP protocol than CS1 may be used provided that it includes basic operations to trigger the service node SN, to receive event notifications and to allow a call to proceed. Moreover when the telephone network TN is a cellular network (such as UMTS or GSM), the INAP protocol may be CAMEL or MAP, for instance.

More, when the telephone network TN is an IP network, the protocol may be SIP or H.323, for instance.

The transmitted message initiates a dialogue between the exchange node SSPN and the service node SN which aims at furnishing to the exchange node SSPN instructions about how to handle the first call to establish.

The method goes on with a third step c) in which the first module M1 of the service node SN checks if the telephone numbers contained in the received message are stored in the memory MY.

If this is the case, the first module M1 decides to manage the concerned call and authorizes the exchange node (service switching point) SSPN to establish the first call in order to set up a managed audio communication between the telephones ACE1 and ACE2 of the calling and called users. The first module M1 then waits for new events relative to the managed call.

If this is not the case, the first module M1 orders to the exchange node (service switching point) SSPN to let the first call proceed normally. So the first call is established but the audio communication, between the telephones ACE1 and ACE2 of the calling and called users, is not managed by the service node SN, and no video transmission will be possible.

Finally this method goes on with a fourth step d) which occurs when the video transmission is required. In this case, the addresses of the video communication equipments VCE1 and VCE2 of the calling and called users, which are associated to the telephone numbers (contained in the received message) in the look up table of the memory MY, are determined so that the second module M2 of the service node SN establishes a video communication between the video communication equipments VCE1 and VCE2, in parallel with the audio communication (first telephone call).

According to the invention at least three different situations may trigger the establishment of the video transmission after a managed (telephone) call has been established.

In a first situation the establishment of the video communication is triggered by one of the telephones ACE1 and ACE2 of the calling and called users dialling a predefined service access code. For this purpose each telephone ACEi may be provided with a dedicated key (or touch or displayed menu) which generates a second call when it is activated by its user.

This second call is intended for an exchange node SSPN, which acts as a dedicated service switching point SSP in the INAP architecture. This local exchange node SSPN may be, but need not to be, the same one used to transmit the message that initiated the managed call to the service node SN. It is effectively possible that two different exchange nodes be used, a first one for the first call and a second one for the second call.

This dedicated service switching point SSP has a telephone number defined by a service access code which is dialled by the dedicated key to initiate the second call after holding the first (telephone) call. This requires that the telephone ACEi is provided with a "hold and initiate second call" function.

The telephone network TN then routes the second call to the exchange node SSPN which acts as a dedicated service switching point SSP connected to the service node SN. This dedicated service switching point SSP receives the second call and detects that it must trigger the service node SN by transmitting a request to it. This request comprises the telephone number of the calling or called user telephone ACEi and the service access code dialled.

The transmitted request initiates a dialogue between the concerned exchange node SSPN and the service node SN which aims at furnishing to this local exchange node SSPN instructions about how to handle the second call.

When the service node SN receives the request its first module M1 first determines if the calling telephone number it comprises is stored in the memory MY.

If this is not the case, the first module M1 orders to the local exchange node (dedicated service switching point) SSPN to end the second call. So the telephone ACEi, which had initiated the second call, is warned that this second call can not be established and the first (telephone) call, which had been hold, is reinstated.

If this is the case the first module M1 determines if the corresponding telephone ACEi is engaged in a managed first call.

If this is not the case, no video communication can be established. Then the first module M1 orders to the local exchange node (dedicated service switching point) SSPN to end the second call. So the telephone ACEi, which had initiated the second call, is warned that this second call can not be established and the first (telephone) call, which had been hold, is reinstated.

If this is the case the first module M1 orders to the local exchange node (dedicated service switching point) SSPN to end the second call so that the first (telephone) call be reinstated. Then the first module M1 determines in the memory MY the addresses of the video communication equipments VCE1 and VCE2 of the calling and called users, which are stored in the look up table in correspondence with the telephone numbers received in the message relative to the first call. Finally the first module M1 transmits these extracted addresses to the second module M2 and orders it to establish a communication between the video communication equipments VCE1 and VCE2 designated by these addresses.

For instance the second module M2 starts a SIP ("Session Initiation Protocol") session to establish the required video communication between the video communication equipments VCE1 and VCE2. For this purpose a SIP Client must run in the video communication equipments VCE1 and VCE2 of the calling and called users and be previously registered in the second module M2 so that their actual IP addresses can be known.

For instance the second module M2 sends an "INVITE" SIP request to the video communication equipment VCE1 of the calling user in order to start a new multimedia session with the called user. The SIP Client running in the video communication equipment VCE1 receives the INVITE SIP request over the Internet network IN, and transmits an INVITE SIP response to the second module M2, comprising a request accept, its capabilities and its listening port, in a Session Description Protocol (SDP) descriptor.

The second module M2 checks the INVITE SIP response and removes any audio capability present in the SDP descriptor in order to avoid any IP audio communication. Then it sends a second INVITE SIP request to the video communication equipment VCE2 of the called user, including the (possibly modified) SDP descriptor sent by the video communication equipment VCE1 of the calling user.

The SIP Client running in the video communication equipment VCE2 receives the INVITE SIP request over the Internet network IN, and transmits an INVITE SIP response to the second module M2, comprising a request accept, its capabilities and its listening port, in a Session Description Protocol (SDP) descriptor.

The second module M2 checks the INVITE SIP response and removes any audio capability present in the SDP descriptor in order to avoid any IP audio communication. Then it forwards the INVITE SIP response to the video communication equipment VCE1, including the (possibly modified) SDP descriptor sent by the video communication equipment VCE2, and keeps monitoring the SIP signalling communication between both video communication equipments VCE1 and VCE2 in case a new event occurs, such as a session closing.

The video communication being established, the calling and called users may exchange audio data over the telephone network TN (with their respective telephones ACE1 and ACE2), and video data over the Internet network IN (with their respective STBs (or PCs) VCE1 and VCE2).

In a second situation the establishment of the video communication is triggered by one of the video communication equipments VCE1 and VCE2 of the calling and called users, if a first (telephone) call has been previously established between the telephones ACE1 and ACE2 of these calling and called users and is managed by the service node SN. For this purpose each video communication equipment VCEi may be provided with a dedicated key (or touch or menu) which generates a video request when it is activated by its user.

This video request comprises the address of the video communication equipment VCEi of the calling or called user and a second address located in the service node SN.

Preferably the action on the dedicated key of one of the video communication equipments VCE1 and VCE2 initiates a SIP session request towards a fictitious SIP address in the service node SN. This SIP session request is sent over the Internet network to the IP address of a first (proxy) service server SS of the Internet network IN, which acts as a SIP server and is in charge of redirecting it to the service node SN.

When the service node SN receives the SIP session request its second module M2 first determines if the SIP address it was sent from is stored in the memory MY.

If this is not the case, the second module M2 rejects the SIP call and transmits the reason of the rejection in a SIP message to the service server SS which routes it over the Internet network IN to the video communication equipment VCEi having initiated the SIP session.

If this is the case the second module M2 determines if the telephone ACEi, whose telephone number is stored in correspondence with the address of the video communication equipment VCEi in the look up table of the memory MY, was previously engaged in a managed first call.

If this is not the case, no video communication can be established. Then the second module M2 rejects the SIP call and transmits the reason of the rejection in a SIP message to the service server SS which routes it over the Internet network IN to the video communication equipment VCEi having initiated the SIP session.

If this is the case the second module M2 rejects this SIP call and transmits the reason of the rejection in a SIP message to the service server SS which routes it over the Internet network IN to the video communication equipment VCEi having initiated the SIP session. Then it starts a SIP session to establish the required video communication between the video communication equipments VCE1 and VCE2 designated by the addresses associated to the telephones ACE1 and ACE2 engaged in the managed conversation. When the video communication is established, the calling and called users may exchange audio data over the telephone network TN (with their respective telephones ACE1 and ACE2), and video data over the Internet network IN (with their respective STBs (or PCs) VCE1 and VCE2).

In a third situation the establishment of the video communication is automatically triggered by the service node SN. In this situation two conditions must be fulfilled: the telephone numbers contained in the message transmitted by the local exchange node SSPN during the establishment of the audio communication must be stored in the memory MY in correspondence with data representative of an automatic video establishment authorization, and the service node SN must have received from the telephone network TN (for instance from the (local) exchange node SSPN) a message signalling that the audio communication has been effectively established between the telephones ACE1 and ACE2 of the calling and called users.

For instance the automatic video establishment authorization is a flag which is stored in correspondence of the telephone number in the look up table of the memory MY.

So in this situation, when the service node SN receives from the telephone network TN a message signalling that an audio communication has been effectively established between two telephones ACE1 and ACE2, its first module M1 determines in the memory MY if a flag, authorizing an automatic video communication establishment, is stored in the look up table in correspondence with each telephone number. If this is not the case, the service node SN proceeds in the same manner that in the two situations described before, allowing the audio communication to start and waiting for indications for either the telephones ACEi or video communication equipments VCEi to start a video session. If this is the case it determines the IP addresses of the video communication equipments VCE1 and VCE2 of the calling and called users, which are stored in the look up table in correspondence with the telephone numbers. Finally the first module M1 transmits these extracted IP addresses to the second module M2 and orders it to establish a video communication between the video communication equipments VCE1 and VCE2 designated by these IP addresses.

For instance the second module M2 starts a SIP ("Session Initiation Protocol") session to establish the required video communication between the video communication equipments VCE1 and VCE2. When the video communication is established, the calling and called users may exchange audio data over the telephone network TN (with their respective telephones ACE1 and ACE2), and video data over the Internet network IN (with their respective STBs (or PCs) VCE1 and VCE2).

Preferably the service node SN, and more precisely its second module M2, is arranged to remove any audio data that could also be transmitted by a video communication equipment VCEi to another one during a video communication, in order to transmit only video streams.

When the (local) exchange node SSPN detects that an audio communication between the audio communication equipments ACE1 and ACE2 is finished, it transmits a message (or release event) to the service node SN. Then the first module M1 sends an indication to the second module M2 so that it closes the video communication.

For this purpose the second module M2 may send a "BYE" SIP message to the video communication equipment VCE1 of the calling user, which acknowledges it back to the second module M2 and stops sending video data. Then the second module M2 may send a "BYE" SIP message to the video communication equipment VCE2 of the called user, which acknowledges it back to the second module M2 and stops sending video data.

It is important to notice that any one of the calling and called users may decide at any time to stop the IP video transmission carried out by its video communication equipment VCEi without affecting the corresponding and parallel audio communication over the telephone network TN.

The invention is not limited to the embodiments of service node and method described above, only as examples, but it encompasses all alternative embodiments which may be considered by one skilled in the art within the scope of the claims hereafter.

The invention claimed is:

1. Method for establishing a video-conference between audio communication equipments (ACE1, ACE2), each associated to a user and to a telephone number and connected to a telephone network (TN), and video communication equipments (VCE1, VCE2), each associated to one of said users and to an IP address and each connected to a video equipment (VE1, VE2) and to an Internet network (IN), characterized in that it comprises:
   a) using an audio communication equipment (ACE1), associated to a calling user, to initiate a first call with at least another audio communication equipment (ACE2), associated to a called user,
   b) routing said first call to a chosen exchange node (SSPN) of said telephone network (TN) so that it transmits a message comprising the telephone numbers of the audio communication equipments (ACE1, ACE2) of said calling and called users, to a service node (SN) connected to said telephone network (TN) and to the Internet network (IN),
   c) authorizing said exchange node (SSPN) to establish said first call when said telephone numbers are stored in a memory (MY) of said service node (SN), in order to set up an audio communication between the audio communication equipments (ACE1, ACE2) of said calling and called users,
   d) determining, if required, the addresses of the video communication equipments (VCE1, VCE2) of said calling and called users which are associated in the memory (MY) of said service node (SN) to said telephone numbers in order to establish a video communication between said video communication equipments (VCE1, VCE2), in parallel with said audio communication;
   wherein the establishment of said video communication is triggered by one of the video communication equipments (VCE1, VCE2) of said calling and called users having established a first call, managed by said service node (SN), between the respective audio communication equipments (ACE1, ACE2);
   wherein the establishment of said video communication is triggered by means of a user action on a dedicated key of the video communication equipment (VCE1, VCE2).

2. Method according to claim 1, characterized in that in step d) the establishment of said video communication is triggered by one of the audio communication equipment (ACE1, ACE2) of said calling and called users.

3. Method according to claim 2, characterized in that in step d) the triggering of the video communication establishment is carried out by means of a second call at a called number defined by a service access code routed to a chosen exchange node (SSPN), after holding said first call.

4. Method according to claim 3, characterized in that in step d) when said exchange node (SSPN) receives said second call it transmits a message to said service node (SN) comprising the telephone number of the audio communication equipment (ACE1) of either said calling or called users and said service access code.

5. Method according to claim 1, characterized in that in steps b) and d) said messages are transmitted by means of an INAP protocol.

6. Method according to claim 5, characterized in that said INAP protocol is CS1.

7. Method according to claim 4, characterized in that in step d) when said service node (SN) receives said message it determines if the telephone number that triggered this message is stored in said memory (MY) and if the audio communication equipment (ACE1) associated to this telephone number has established a first call, managed by itself (SN), and in this case it establishes said video communication between the addresses of the video communication equipments (VCE1, VCE2) of said calling and called users of the managed call.

8. Method according to claim 1, characterized in that in step d) the establishment of said video communication is triggered by means of a user action on a dedicated key of the audio communication equipment (ACE1, ACE2).

9. Method according to claim 1, characterized in that in step d) the triggering of the video communication establishment is carried out by means of the transmission of a video request, comprising the address of the video communication equipment (VCE1) of either said calling or called users and a second address in said service node (SN), at a dedicated address of a dedicated service server (SS) arranged to route said video request to said service node (SN), through said Internet network (IN).

10. Method according to claim 9, characterized in that in step d) when said service node (SN) receives said video request it determines if the address having generated it is stored in said memory (MY) and if the audio communication equipment (ACE1) associated to this address is engaged in a first call, managed by said service node (SN), and in this case said service node (SN) establishes said video communication between the addresses of the video communication equipments (VCE1, VCE2) of said calling and called users.

11. Method according to claim 1, characterized in that in step d) said service node (SN) automatically triggers the establishment of said video communication if i) the telephone numbers of the audio communication equipments (ACE1, ACE2) of said calling and called users are stored in said memory (MY) in correspondence with data representative of an automatic video establishment authorization, and ii) it has received from said telephone network (TN) a message signaling that the audio communication has been effectively established between the audio communication equipments (ACE1, ACE2) of said calling and called users.

12. Method according to claim 1, characterized in that in step d) said service node (SN) establishes said video communication by means of a SIP call between the addresses of the video communication equipments (VCE1, VCE2) of said calling and called users.

13. Method according to claim 1, characterized in that during said video communication said service node (SN) removes any audio data from said video data transmitted by one of said video communication equipments (VCE1, VCE2) to the other in order to only transmit video streams.

14. Method according to claim 7, characterized in that when said exchange node (SSPN) detects that the audio communication between said audio communication equipments (ACE1, ACE2) is finished, it transmits a message to said service node (SN), and when said service node (SN) receives this message it stops said video communication.

15. Method according to claim 1, characterized in that said audio communication establishment is controlled by means of a first module (M1) of said service node (SN) and said video communication establishment is controlled by means of a second module (M2) of said service node (SN), connected to said first module (M1).

16. Method according to claim 1, wherein each audio communication equipment (ACE1, ACE2) is chosen in a group comprising at least a fixed telephone and a mobile telephone.

17. Method according to claim 1, wherein each video communication equipment (VCE1, VCE2) is chosen in a group comprising at least a personal computer and a TV connected to a set-top-box.

18. Method according to claim 1, wherein each video equipment (VE1, VE2) is a digital video camera.

* * * * *